United States Patent [19]
Higginbotham

[11] Patent Number: 5,306,100
[45] Date of Patent: Apr. 26, 1994

[54] VOID FILLER

[75] Inventor: David D. Higginbotham, Bent Mountain, Va.

[73] Assignee: Corrugated Container Corporation, Roanoke, Va.

[21] Appl. No.: 12,504

[22] Filed: Feb. 2, 1993

[51] Int. Cl.$^5$ .................... B61D 45/00; B63B 25/24
[52] U.S. Cl. ................... 410/154; 206/593; 410/122; 428/116
[58] Field of Search ............ 410/154, 155, 121, 122; 428/12, 116; 206/593; 108/53.1; 52/381, 577, 731.1, 731.2, 731.6

[56] References Cited

U.S. PATENT DOCUMENTS

| | | | |
|---|---|---|---|
| 3,405,659 | 10/1968 | Hees | 410/154 |
| 3,842,757 | 10/1974 | Kinnune, Jr. | 410/154 |
| 3,892,898 | 7/1975 | Yasui | 428/116 |
| 4,007,309 | 2/1977 | Sewell | 428/116 |
| 4,102,525 | 7/1978 | Albano | 108/51.3 X |
| 4,109,587 | 8/1978 | Jansen, Jr. | 410/154 |
| 4,363,579 | 12/1982 | Rogers | 410/154 |
| 4,372,717 | 2/1983 | Sewell et al. | 410/154 |
| 4,386,881 | 6/1983 | Liebel | 410/154 |
| 4,494,897 | 1/1985 | Rogers | 410/154 |
| 4,585,381 | 4/1986 | Boyse | 410/154 |
| 4,865,889 | 9/1989 | Boyse | 410/154 X |
| 5,062,751 | 11/1991 | Liebel | 410/154 |
| 5,139,842 | 8/1992 | Sewell | 428/116 |

Primary Examiner—Michael S. Huppert
Assistant Examiner—James Eller
Attorney, Agent, or Firm—Dennison, Meserole, Pollack & Scheiner

[57] ABSTRACT

A void filler including a casing with opposed vertical side walls and opposed face walls. The casing confines an expandable and collapsible core formed of centrally folded strips with the opposed ends of each strip secured to the opposed side walls. The strips are formed in two facing groups, each of a general chevron pattern with the strips collapsing entirely within the casing upon an inward movement of the opposed side walls into parallel overlying engagement, the strips folding between the side walls and defining a minimal layering of panels between the side walls.

17 Claims, 2 Drawing Sheets

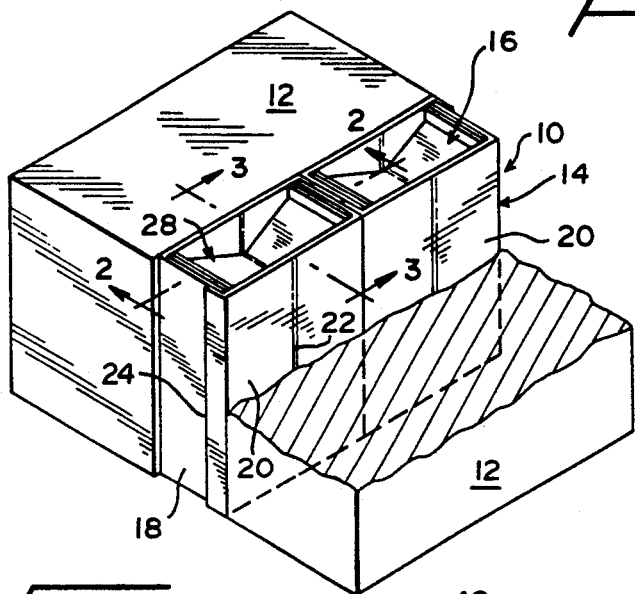
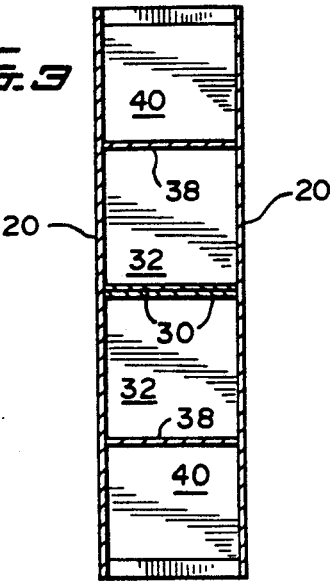
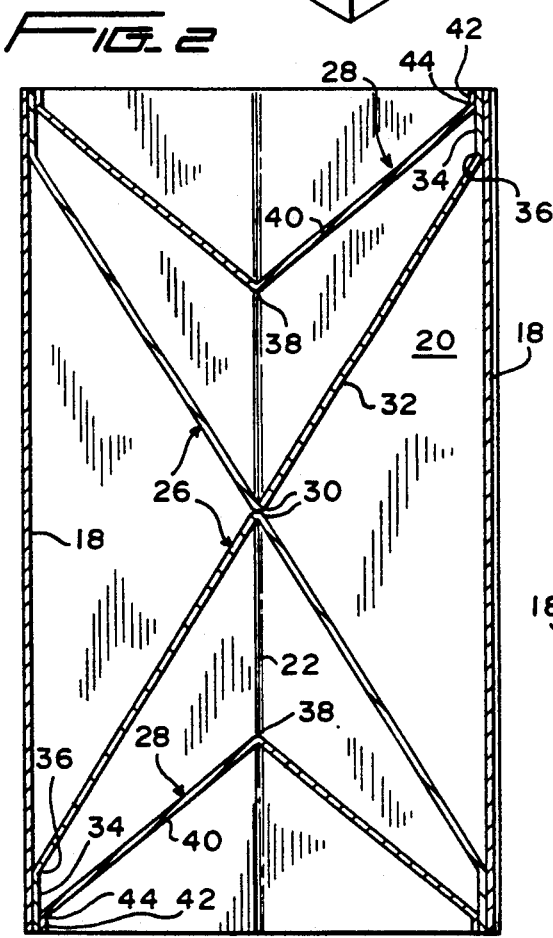
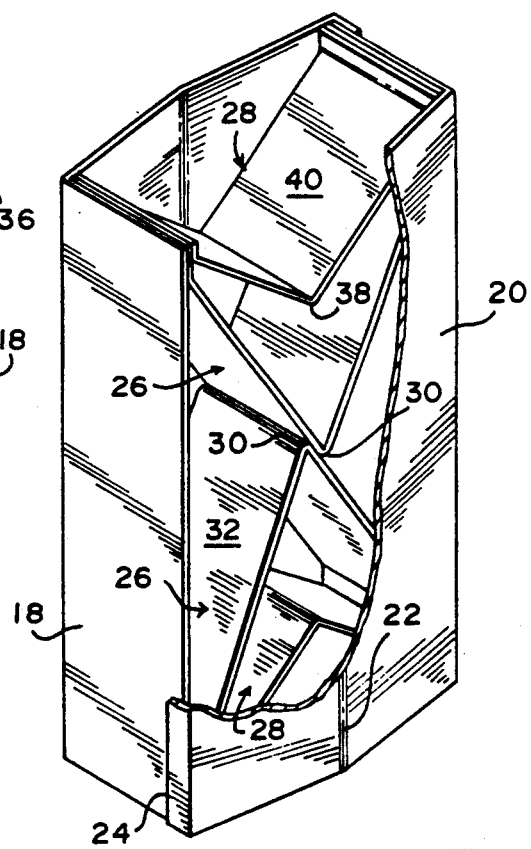

VOID FILLER

BACKGROUND OF THE INVENTION

The invention broadly relates to dunnage of the type utilized as spacers and stabilizers for transport loads, as in railroad boxcars, trucks and container ships.

Such dunnage basically comprises void fillers which are used to fill spaces between articles, shipping containers, and the like, or between such containers and one or more walls of the transport vehicle.

In recent years void fillers have conventionally been formed of corrugated paperboard or cardboard utilizing a collapsible honeycomb structure adapted to collapse for shipment and storage, and expanded for use.

Problems arise with void fillers of this type, including the necessity for rather complex arrangements of the strips utilized to form the honeycomb core in seeking the ability to compactly collapse, while at the same time providing a stable structure without distortion when erected.

The various known structures, notwithstanding the desire for simplicity and economy, must also utilize a substantial amount of material in repeated patterns of cells which in turn provide an appreciable bulk when collapsed. This bulk is clearly not desirable when the collapsed dunnage or void formers are to be stored or shipped.

Problems have also been noted with regard to the tendency for the expanded honeycomb to provide a distorted configuration to the erected void filler.

SUMMARY OF THE INVENTION

The void filler of the present invention, preferably formed of corrugated paperboard, utilizes a distinctly different collapsible core assembly which avoids the conventional multi-cell honeycomb construction and the inherent bulk thereof, while at the same time providing all of the strength normally required by this type of void filler or dunnage.

The core utilizes centrally folded strips arranged in facing groups with the strips of each group defining a generally chevron pattern. Each of the strips extends the full length of the erected void filler and has the opposed ends thereof secured to opposed side walls of the casing. The strips thus are structurally simple, easily formed and readily assembled within the casing with substantial economies in both material and manufacture.

Upon a collapsing of the filler, the side walls move inwardly toward each other and the core strips centrally fold and are completely confined therebetween.

The strips are so oriented relative to each other as to, in the erected or expanded position, provide multiple areas of lateral support inwardly of the side walls for substantially the entire height of the void filler.

In the collapsed position of the void filler, the core strips individually fold with the panels of each strip positioned in adjacent overlying parallel relation to each other and with each strip in turn minimally overlapping the folded adjacent strips whereby minimal layering of material occurs between the collapsed side walls.

The void filler is completed by a pair of opposed face walls, each centrally folded on a vertical fold line and engaged with the corresponding edges of the two side walls along similar fold lines which, upon an inward collapsing of the side walls toward each other, provide for a corresponding collapsing of the face walls into substantially parallel relationship with the side walls.

When the void filler is expanded into its operative position, the face walls seat directly on the opposed edges of the core strips, which are of equal width with the side walls, and define opposed planar bearing surfaces against which the loads can engage.

These together with additional features and advantages of the invention will become apparent from the more detailed description of the construction and manner of use of the invention as more fully hereinafter set forth.

BRIEF DESCRIPTION OF THE DRAWINGS

FIG. 1 is a perspective view of erected or expanded void fillers in operative use as a load separator and stabilizer;

FIG. 2 is an enlarged cross-sectional view of a void filler taken substantially on a plane along line 2—2 in FIG. 1;

FIG. 3 is an enlarged transverse cross-sectional view taken substantially on a plane passing along line 3—3 in FIG. 1;

FIG. 4 is a perspective view of the void filler, with the casing partially removed, illustrating the manner of folding;

DESCRIPTION OF THE PREFERRED EMBODIMENTS

Figure 5:
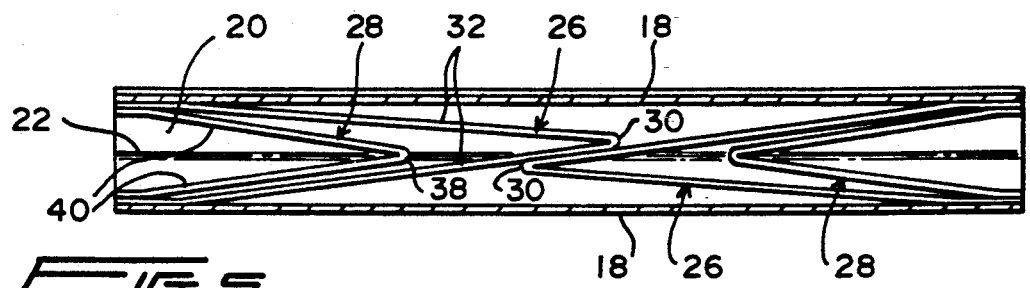
FIG. 5 is a view of the void filler slightly expanded from its completely collapsed position and with the near face wall removed to illustrate orientation of the collapsed strips.

FIG. 1 illustrates the dunnage or void filler 10 operatively positioned between spaced loads 12 as a protection and stabilizing means. As will be appreciated, the void filler 10 is equally adapted for positioning between a load and an adjacent wall of the transport vehicle.

The void filler is in its entirety preferably constructed of foldable corrugated paperboard with the individual components adhesively joined for folding adjustment between a flat storage and shipping position, and an expanded and rigid in-use position.

The void filler 10 comprises a casing 14 and a core 16. The casing 14, considering the erected position of the filler 10, includes a pair of vertically elongate opposed panel-formed side walls 18 of a width determined by the void to be filled.

The side walls are interconnected by equal height panel-formed face walls 20. The opposed vertical edges of each face wall are foldably joined to the corresponding vertical edges of the side walls with the opposed side walls 18 and opposed face walls 20 defining, in the erected position, a rectangular configuration having open upper and lower outer ends.

Figure 6:
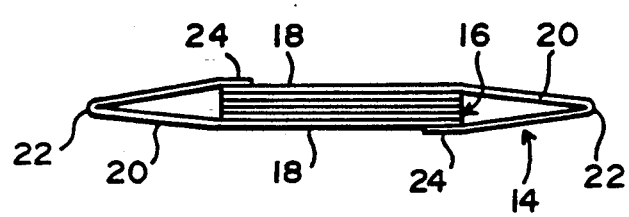
FIG. 6 is an end elevation view of the completely collapsed void filler, the thicknesses of the panels being exaggerated for purposes of illustration.

Each of the face walls 20 is provided with a central full length vertical fold line 22. So formed, when collapsing from the erected box like rectangular erected position of FIG. 1, the opposed face walls 20 fold outwardly relative to each other, that is with the respective fold lines 22 moving outward to define the opposed outer edges of the collapsed filler 10 as in FIG. 6. At the same time, the opposed side walls 18 move inwardly, folding about the respective vertical edges thereof, into overlying relation to each other.

As illustrated, and depending upon the actual size of the void filler 10, it is preferred the casing 14 be formed from two folded sheets of appropriate corrugated paperboard or cardboard with the free edges thereof overlapped and adhesively bonded as suggested at 24.

The core 16, in the embodiment of FIGS. 1-6, is formed of a pair of inner strips 26 and a corresponding pair of outer strips 28. Each of the strips 26, 28 extends across the full length of the erected casing 14 between the opposed parallel side walls 18, and is of a width substantially equal to that of the side walls whereby the opposed longitudinal edges of the strips define bearing surfaces for the opposed face walls 20.

The first and second inner strips 26 are each formed with a central vertex fold 30 with strip panels 32 defined to the opposite sides thereof and terminating in outer strip ends 34.

With continued reference to the erected void filler 10, the inner strips 26, and the vertex folds 30 thereof, are oppositely directed with the vertex folds 30 in adjacent parallel facing relation to each other at approximately the central point of the casing 14. The two panels 32 of each strip 26 diverge at an angle from each other from the vertex fold therebetween and terminate with the outer ends 34 thereof adjacent one vertical end of the opposite casing side walls 18. In light of the opposite orientation of the first and second inner strips 26, it will be appreciated that the opposed ends of one strip 26 are located at the respective upper ends of the side walls, while the opposed ends of the second strip 26 are located at the respective lower ends of the side walls 18.

Each of the strip ends is laterally turned relative to the adjacent panel 32 along a fold line 36 and is bonded to the inner face of the corresponding casing side wall 18.

In the erected position, the oppositely directed vertex folds 30 are in adjacent parallel relation with each other and may either actually contact each other as illustrated or be minimally offset from each other. Upon a folding of the void filler 10, by movement of the side walls inwardly toward each other and outwardly collapsing the face walls 20 about fold lines 22, the two strips 26 fold upon themselves with the vertex folds 30 bypassing each other while maintaining the parallel relationship, and with the panels 32 of one inner strip 26 partially overlapping the panels 32 of the second inner strip 26 and defining, in the area of overlap, a multiple layering of only four panels or plies between the opposed collapsed side walls 18.

The outer strips 28 comprise first and second strips which are located vertically outward respectively of the first and second inner strips 26 and are similarly formed with oppositely directed central vertex folds 38 and diverging panels 40 which terminate in ends 42 folded or turned about fold lines 44 and adhesively bonded to the inner faces of the side walls or turned ends 34 of the inner strips 26.

The strips 28 are relatively shorter than the strips 26. The panels 40 of each strip 28 diverge outwardly from the vertex fold 38 therebetween at a greater angle than the angle of divergence of the panels 32 in the erected position, and thus define opposed bearing edges which extend across the length of the void filler intermediate of the bearing edges of the inner strips 26 and the vertical upper and lower outer ends of the casing.

The orientation of the outer strips 28 relative to the inner strips 26 is such as to provide maximum support along the length of the void filler 10 between the opposed side walls 18.

With reference to FIG. 5, as the void filler 10 is collapsed, with the side walls 18 moved inward toward each other, the first and second outer strips 28 fold inwardly toward each other and between the panels 32 of the corresponding inner strips 26. The length of the panels 40 of the outer strips 28 are such as to, in the completely collapsed position, terminate outward of not only the vertex fold of the corresponding inner strip 26, but also outward of the vertex fold of the opposed inner strip. In other words, the vertex fold 38 of the collapsed upper outer strip 28 terminates above the vertex fold 30 of the lower inner strip 26. In this manner there is no overlap between the panels 40 of each outer strip 28 and the panels 32 of the opposed inner strip 26. Thus, in the collapsed void filler 10, an inner thickness between the collapsed side walls 18 of only four plies or panels is maintained, as above described with regard to the collapsed inner strips 26. This in turn results in an extremely flat collapsed void filler as suggested in FIG. 6 wherein the thickness of the panels, for purposes of illustration, has actually been exaggerated. It will also be recognized that the core 16, or more particularly the strips thereof, all collapse inward relative to the side walls and are completely confined therebetween, in contrast to a conventional honeycomb core which will tend to, upon collapse, extend outward beyond the casing walls, and define a substantially greater number of plies between the collapsed wall and an appreciably greater bulk than that of the present invention.

In order to space each outer strip 28 from the corresponding inner strip 26 toward the opposed ends thereof, and allow for the unencumbered folding and expanding thereof, it will be noted that each fold line 36 adjacent each turned end 34 of the inner strips 26 is spaced vertically inward of the corresponding fold line 44 of the corresponding turned end 42 of the adjacent outer strip 28.

In the erected carton, the vertex folds 30, 38 of all of the strips are in substantial vertical alignment along the vertical center line of the void filler 10, and thereby provide for a maximum degree of stability at this critical area. It will also be noted the side walls 18 provide for a rigidification and bracing of the void filler 10 along the full vertical height of the opposed edges. Bracing between the vertical edges and the vertical center line is effectively provided by the angularly oriented panels of the inner and outer strips.

As will be appreciated, utilizing single, centrally folded strips which span the entire length of the casing, and which are oriented in what might be considered opposed facing or inwardly directed chevron patterns, uniquely provides for a highly stable erected structure with minimal material and with the components so arranged as to provide for maximum compaction to a stored or shipping position wherein the void filler comprises basically two overlying planar panels with a core of a minimum number of plies, four in the illustrated example, sandwiched centrally therebetween and providing, as a practical matter, minimal impact on the planar nature of the collapsed casing, particularly as compared to conventional honeycomb structures.

Figure 7:
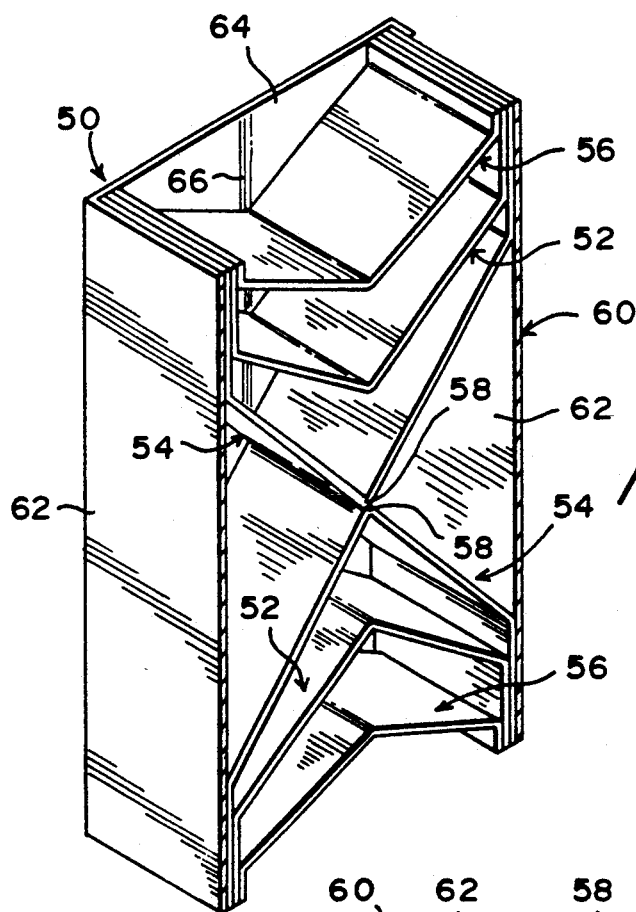
FIG. 7 is a vertical view, with a face wall removed, of a second embodiment of greater height and utilizing additional core strips.
Figure 8:
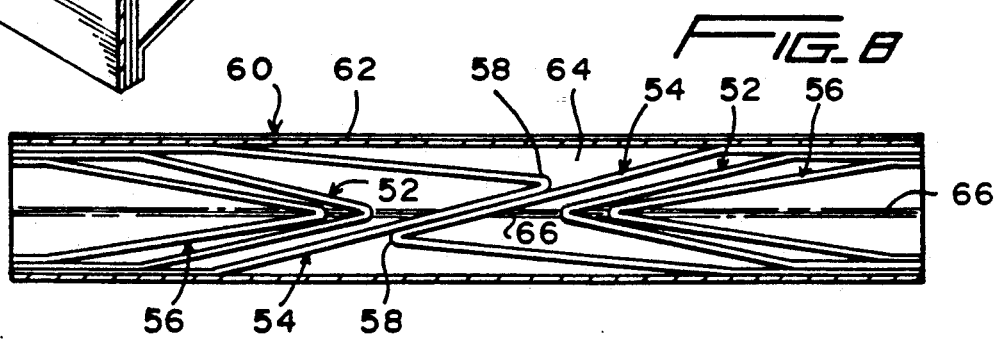
FIG. 8 is a view illustrating the filler of FIG. 7 with the near face wall removed and the core expanded from its fully collapsed position only sufficiently to illustrate the relationship of the collapsed strips to each other and to the opposed side walls.

FIGS. 7 and 8 illustrate a second embodiment of void filler 50 wherein the vertical height to transverse length ratio is such as to make it practical to incorporate one or more intermediate strips 52 in each chevron pattern of strips between the respective inner strips 54 and outer strips 56.

With reference to the expanded void filler of FIG. 7, the vertex folds 58 of the first and second inner strips 54, similar to the vertex folds 30 of the inner strips 26 of the first embodiment, are positioned in adjacent parallel relation to each other along the vertical center line of the casing 60 between the opposed side walls 62. The intermediate strips 52 and outer strips 56 are progressively shorter than the corresponding inner strips 54 with the respective panels thereof oriented at progressively greater angles. That is the angle of the panels of an intermediate strip 52 is greater than the vertex angle between the panels of the corresponding inner strip 54 and less than that of the vertex angle of the panels of the corresponding outer strip 56.

The outer ends of each of the strips are turned or folded to parallel the inner faces of the opposed side walls 62 and are bonded thereto or to each other with the formed folds both at the ends and defining the vertex folds providing for the necessary hinged action to allow for the folding and expanding of the core strips. It will also be noted that the corresponding fold lines at the ends of each group of strips are vertically spaced to provide for a vertical spacing of the panels of the strips adjacent these ends for maximum rigidification of the casing in the expanded position.

Also as with the first embodiment, the vertex folds of all of the strips vertically aligned along the vertical center line of the void filler 50, the strips are of equal width with the casing side walls 62, and the opposed longitudinal edges of the strips define bearing edges for the opposed casing face walls 64. The face walls 64 are in turn each provided with a vertical fold line 66 centrally thereacross for an outward collapsing of the face walls upon each other as the side walls are moved inwardly and the core strips collapsed therebetween.

Noting FIG. 8, with the use of one or more intermediate strips, it is possible the stacking of the strip panels within the collapsed void filler will define more than four plies as opposed to the preferred situation wherein only four plies or layers are defined by the collapsed core. Nevertheless, the internal layering of the collapsed core strips on each other, for the number of strips involved, is kept at a minimum in that each strip, extending the full length of the void filler, defines only two panels or plies when collapsed. Further, regardless of the number of intermediate strips utilized, the core in its entirety collapses inward relative to the opposed upper and lower outer ends of the casing 60. The void filler 50 thus provides all of the advantages of the void filler 10 including the utilization of minimal material while providing an expanded filler of high strength and stability, and provision for the collapse of the filler into a compact substantially planar position for easy storage and shipment with the strip-formed core completely contained within the collapsed casing.

As previously noted, all of the components of both forms of void filler are preferably of corrugated paperboard or cardboard, consisting of a corrugated sheet between two planar face sheets for maximum rigidity, reduced weight and low expense. The corrugations in the side walls and core strips, also for maximum rigidity, will align across the width of the respective components between the opposed face walls which directly receive the loads thereagainst.

The foregoing is illustrative of the features of the invention. Other embodiments incorporating such features may occur to those skilled in the art, and should be considered as within the scope of the invention as claimed.

I claim:

1. A collapsible and expandable void filler comprising a casing and a core mounted therein, said casing having opposed outer ends, a pair of side walls positioned in facing relation to each other and extending between said opposed outer ends of said casing, said core including multiple elongate strips, each of said strips having remote ends and being centrally folded to form adjacent panels joined at a vertex fold which defines hinge means between said panels of each strip, each strip extending between said side walls and having said remote ends thereof secured to said side walls, said side walls being selectively movable between an expanded position with said side walls remote from each other and with each of said strips having the adjacent panels thereof diverging at an angle relative to each other outward from the vertex fold therebetween, and a collapsed position with said side walls adjacent each other and with each of said strips having the adjacent panels thereof folded in substantially parallel overlying orientation to each other wherein said elongate strips comprise first and second inner strips positioned inward of said opposed outer ends of said casing with said vertex folds thereof oppositely directed and in facing relation to each other, said vertex folds of said first and second strips, in said expanded position being parallel and proximate, and in said collapsed position being parallel and laterally offset, with the panels of said first strip overlapping and substantially paralleling the panels of said second inner strip to form overlapping portions.

2. The void filler of claim 1 wherein said elongate strips include first and second outer strips positioned respectively outward of said first and second inner strips between said inner strips and said outer ends of said casing, each said outer strip having remote ends secured to said spaced side walls and being centrally folded to form adjacent panels joined at a vertex fold which defines a hinge between the panels, each said folded outer strip having the vertex fold thereof commonly directed with the vertex fold of the corresponding inner strip, each said outer strip, in said expanded position, having the adjacent panels thereof diverging at an angle relative to each other outward of the vertex fold therebetween, and in said collapsed position have the panels thereof folded into substantially parallel overlying orientation.

3. The void filler of claim 2 wherein, in said expanded position, the angle at which the panels of each outer strip diverge is greater than the angle at which the panels of the corresponding inner strip diverge.

4. The void filler of claim 3 wherein the panels of each outer strip are shorter than the panels of the corresponding inner strip.

5. The void filler of claim 4 wherein, in said collapsed position, said panels of each outer strip are received between the panels of the corresponding inner strip.

6. The void filler of claim 5 wherein, in said collapsed position, the vertex fold of each outer strip is positioned outward of the overlapping portions of the first and second inner strips.

7. The void filler of claim 6 wherein said side walls and said elongate strips are of equal width, each of said side walls having opposed full height edges, each of said elongate strips having opposed full length bearing edges adapted to bear a load directed thereagainst.

8. The void filler of claim 7 including a pair of face walls overlying the opposed bearing edges of said strips, each face wall having opposed vertical edges foldably joined to the corresponding edges of said side walls along the vertical extent thereof, each of said face walls having a vertical fold line centrally along the full height thereof and dividing the face wall into two face panels, each face wall, in the expanded position of said void filler, engaging against the corresponding bearing edges of said strips with the face panels in coplanar relation, each of said face walls, in said collapsed position, having the face panels thereof folded inward in generally overlying relation to each other and generally parallel to said side walls with said strips confined between said side walls.

9. The void filler of claim 8 wherein said elongate strips, in said collapsed position are entirely inward of said opposed outer ends of said casing.

10. The void filler of claim 9 including at least one intermediate strip positioned between each inner strip and the corresponding outer strip, each said intermediate strip having remote ends secured to said spaced side walls and being centrally folded to form adjacent panels joined at a vertex fold which defines a hinge between the panels, the vertex fold of each intermediate strip being commonly directed with the vertex folds of the corresponding inner and outer strips.

11. The void filler of claim 10 wherein, in said expanded position, the panels of each intermediate strip diverge at an angle relative to each other outward of the vertex fold therebetween which is greater than the angle at which the panels of the corresponding inner strip diverge.

12. The void filler of claim 2 wherein, in said collapsed position, said panels of each outer strip are received between the panels of the corresponding inner strip.

13. The void filler of claim 12 wherein, in said collapsed position, the vertex fold of each outer strip is positioned outward of the overlapping portion of the first and second inner strips.

14. The void filler of claim 2 wherein said side walls and said elongate strips are of equal width, each of said side walls having opposed full height edges, each of said elongate strips having opposed full length bearing edges adapted to bear a load directed thereagainst.

15. The void filler of claim 14 including a pair of face walls overlying the opposed bearing edges of said strips, each face wall having opposed vertical edges foldably joined to the corresponding edges of said side walls along the vertical extent thereof, each of said face walls having a vertical fold line centrally along the full height thereof and dividing the face wall into two face panels, each face wall, in the expanded position of said void filler, engaging against the corresponding bearing edges of said strips with the face panels in coplanar relation, each of said face walls, in said collapsed position, having the face panels thereof folded inward in generally overlying relation to each other and generally parallel to said side walls with said strips confined between said side walls.

16. The void filler of claim 2 including at least one intermediate strip positioned between each inner strip and the corresponding outer strip, each said intermediate strip having remote ends secured to said spaced side walls and being centrally folded to form adjacent panels joined at a vertex fold which defines a hinge between the panels, the vertex fold of each intermediate strip being commonly directed with the vertex folds of the corresponding inner and outer strips.

17. The void filler of claim 16 wherein, in said expanded position, the panels of each intermediate strip diverge at an angle relative to each other outward of the vertex fold therebetween which is greater than the angle at which the panels of the corresponding inner strip diverge.

* * * * *